United States Patent
Greenwald et al.

(10) Patent No.: US 10,817,512 B2
(45) Date of Patent: Oct. 27, 2020

(54) STANDING QUERIES IN MEMORY

(71) Applicant: Arista Networks, Inc., Santa Clara, CA (US)

(72) Inventors: Michael Greenwald, Berkeley, CA (US); Stephen Schleimer, Campbell, CA (US)

(73) Assignee: Arista Networks, Inc., Santa Clara, CA (US)

(*) Notice: Subject to any disclaimer, the term of this patent is extended or adjusted under 35 U.S.C. 154(b) by 300 days.

(21) Appl. No.: 15/274,228

(22) Filed: Sep. 23, 2016

(65) Prior Publication Data
US 2017/0286483 A1    Oct. 5, 2017

Related U.S. Application Data

(60) Provisional application No. 62/317,302, filed on Apr. 1, 2016.

(51) Int. Cl.
| | |
|---|---|
| *G06F 17/00* | (2019.01) |
| *G06F 7/00* | (2006.01) |
| *G06F 16/2453* | (2019.01) |
| *G06F 16/245* | (2019.01) |
| *G06F 16/17* | (2019.01) |
| *G06F 16/2455* | (2019.01) |
| *G06F 3/06* | (2006.01) |
| *H04L 12/947* | (2013.01) |
| *H04L 12/879* | (2013.01) |

(52) U.S. Cl.
CPC ...... *G06F 16/24534* (2019.01); *G06F 3/0604* (2013.01); *G06F 3/067* (2013.01); *G06F 3/0638* (2013.01); *G06F 3/0659* (2013.01); *G06F 16/1734* (2019.01); *G06F 16/245* (2019.01); *G06F 16/24568* (2019.01); *H04L 49/25* (2013.01); *H04L 49/901* (2013.01)

(58) Field of Classification Search
USPC ........................................................ 707/721
See application file for complete search history.

(56) References Cited

U.S. PATENT DOCUMENTS

| | | |
|---|---|---|
| 5,327,556 A | 7/1994 | Mohan et al. |
| 5,892,894 A | 4/1999 | Shiroshita et al. |
| 6,366,915 B1 | 4/2002 | Rubert et al. |
| 6,487,560 B1 | 11/2002 | LaRue et al. |
| 6,502,093 B1 | 12/2002 | Bhatt et al. |
| 6,732,124 B1 | 5/2004 | Koseki et al. |

(Continued)

OTHER PUBLICATIONS

Allan et al.; Record Architecture for a Relational Database Management System Supporting Null Values and Extensible Tables; IP.com; 2005.

(Continued)

*Primary Examiner* — Pavan Mamillapalli
(74) *Attorney, Agent, or Firm* — Chamberlain, Hrdlicka, White, Williams & Aughtry

(57) ABSTRACT

A network device includes a database that includes a number of tables, an observer, and a query service (QS) manager. The observer monitors an element of a first table of the number of tables and provide a value of the element to a query instance of a number of query instances. The QS manager generate the number of query instances. The query instance of the number of query instances executes a compiled query in response to receiving the value.

16 Claims, 17 Drawing Sheets

(56) References Cited

U.S. PATENT DOCUMENTS

| | | |
|---|---|---|
| 6,834,276 B1 | 12/2004 | Jensen et al. |
| 6,910,070 B1 | 6/2005 | Mishra et al. |
| 7,177,859 B2 | 2/2007 | Pather et al. |
| 7,360,202 B1 | 4/2008 | Seshadri et al. |
| 7,590,666 B2 | 9/2009 | Korman et al. |
| 7,698,276 B2 | 4/2010 | Seshadri et al. |
| 8,150,959 B1 | 4/2012 | Bezdicek et al. |
| 8,239,589 B1 | 8/2012 | Certain et al. |
| 8,631,034 B1 | 1/2014 | Peloski |
| 8,914,404 B1 | 12/2014 | Kim et al. |
| 9,009,289 B1 | 4/2015 | Jacob |
| 9,032,017 B1 | 5/2015 | Singh |
| 9,049,484 B2 * | 6/2015 | Major .................. G06F 21/6218 |
| 9,208,032 B1 | 12/2015 | McAlister |
| 9,529,682 B2 | 12/2016 | McAlister |
| 10,042,674 B2 | 8/2018 | Brown et al. |
| 10,331,634 B2 | 6/2019 | Hu |
| 2002/0004736 A1 | 1/2002 | Roundtree et al. |
| 2002/0007363 A1 | 1/2002 | Vaitzblit |
| 2002/0016827 A1 * | 2/2002 | McCabe .............. G06F 11/2069 709/213 |
| 2003/0018644 A1 | 1/2003 | Bala et al. |
| 2004/0002972 A1 | 1/2004 | Pather et al. |
| 2004/0098425 A1 | 5/2004 | Wiss et al. |
| 2004/0205048 A1 | 10/2004 | Pizzo |
| 2005/0125528 A1 * | 6/2005 | Burke, II ................ H04L 63/30 709/223 |
| 2005/0165731 A1 | 7/2005 | Funk |
| 2006/0143543 A1 * | 6/2006 | Mandrell .............. G06F 3/0655 714/43 |
| 2006/0206532 A1 * | 9/2006 | MacLaurin ........... G06F 11/302 707/999.2 |
| 2007/0050392 A1 | 3/2007 | Shukla et al. |
| 2007/0266331 A1 | 11/2007 | Bicker et al. |
| 2008/0104008 A1 | 5/2008 | Brantley et al. |
| 2008/0162849 A1 | 7/2008 | Savagaonkar et al. |
| 2008/0163073 A1 * | 7/2008 | Becker .................. G06Q 30/00 715/753 |
| 2008/0165943 A1 | 7/2008 | Gonzalez Lopez et al. |
| 2008/0208672 A1 | 8/2008 | Van Riel et al. |
| 2008/0208806 A1 | 8/2008 | Dalfo et al. |
| 2008/0300706 A1 | 12/2008 | Ruml et al. |
| 2008/0313637 A1 | 12/2008 | Youn |
| 2009/0024752 A1 | 1/2009 | Shitomi |
| 2009/0063381 A1 | 3/2009 | Chan et al. |
| 2009/0234680 A1 | 9/2009 | Newton |
| 2009/0300528 A1 | 12/2009 | Stambaugh |
| 2010/0161555 A1 | 6/2010 | Mica et al. |
| 2010/0281102 A1 | 11/2010 | Chinta |
| 2011/0055231 A1 | 3/2011 | Huck et al. |
| 2011/0214050 A1 | 9/2011 | Stambaugh |
| 2011/0314047 A1 | 12/2011 | Koronthaly et al. |
| 2011/0320620 A1 | 12/2011 | Cutler et al. |
| 2012/0005220 A1 * | 1/2012 | Schindlauer .......... G06F 16/245 707/769 |
| 2012/0023077 A1 * | 1/2012 | Kann .................... G06F 16/275 707/702 |
| 2012/0112893 A1 | 5/2012 | Bezdicek et al. |
| 2012/0190325 A1 | 7/2012 | Abu-Hakima |
| 2012/0310906 A1 | 12/2012 | Miller et al. |
| 2013/0041781 A1 | 2/2013 | Freydberg |
| 2013/0150007 A1 | 6/2013 | Wang et al. |
| 2013/0188515 A1 | 7/2013 | Pinheiro et al. |
| 2013/0325609 A1 * | 12/2013 | Sokolov ............... G06Q 50/184 705/14.54 |
| 2014/0095535 A1 | 4/2014 | Deshmukh |
| 2014/0229221 A1 | 8/2014 | Shih |
| 2014/0310258 A1 | 10/2014 | Tian |
| 2014/0317084 A1 | 10/2014 | Chaudhry et al. |
| 2015/0009818 A1 | 1/2015 | Xiao et al. |
| 2015/0019701 A1 | 1/2015 | Marvin et al. |
| 2015/0149631 A1 | 5/2015 | Lissack |
| 2015/0193477 A1 | 7/2015 | Dunnant |
| 2015/0207794 A1 | 7/2015 | Lee et al. |
| 2015/0302149 A1 * | 10/2015 | Whitsitt ................. G16H 10/60 705/3 |
| 2015/0317399 A1 * | 11/2015 | Akselrod ............... G06Q 30/06 707/723 |
| 2016/0098450 A1 | 4/2016 | Tandon et al. |
| 2016/0283545 A1 | 9/2016 | Benke et al. |
| 2016/0299799 A1 * | 10/2016 | De Smet ................. G06F 9/542 |
| 2016/0308940 A1 | 10/2016 | Procopio et al. |
| 2017/0063948 A1 | 3/2017 | Shroff et al. |
| 2017/0177697 A1 | 6/2017 | Lee et al. |
| 2017/0213257 A1 | 7/2017 | Murugesan et al. |
| 2019/0258613 A1 | 8/2019 | Hu |

OTHER PUBLICATIONS

IEEE 100—The Authoritative Dictionary of IEEE Standard Terms; Published by Standards Information Network, IEEE Press; 7th Edition; pp. 1133-1134; 2000.

What is a Database Schema? Published by Database Guide Jun. 6, 2016.

What is a Database Schema?, Database Guide, Database Guide 2016.

* cited by examiner

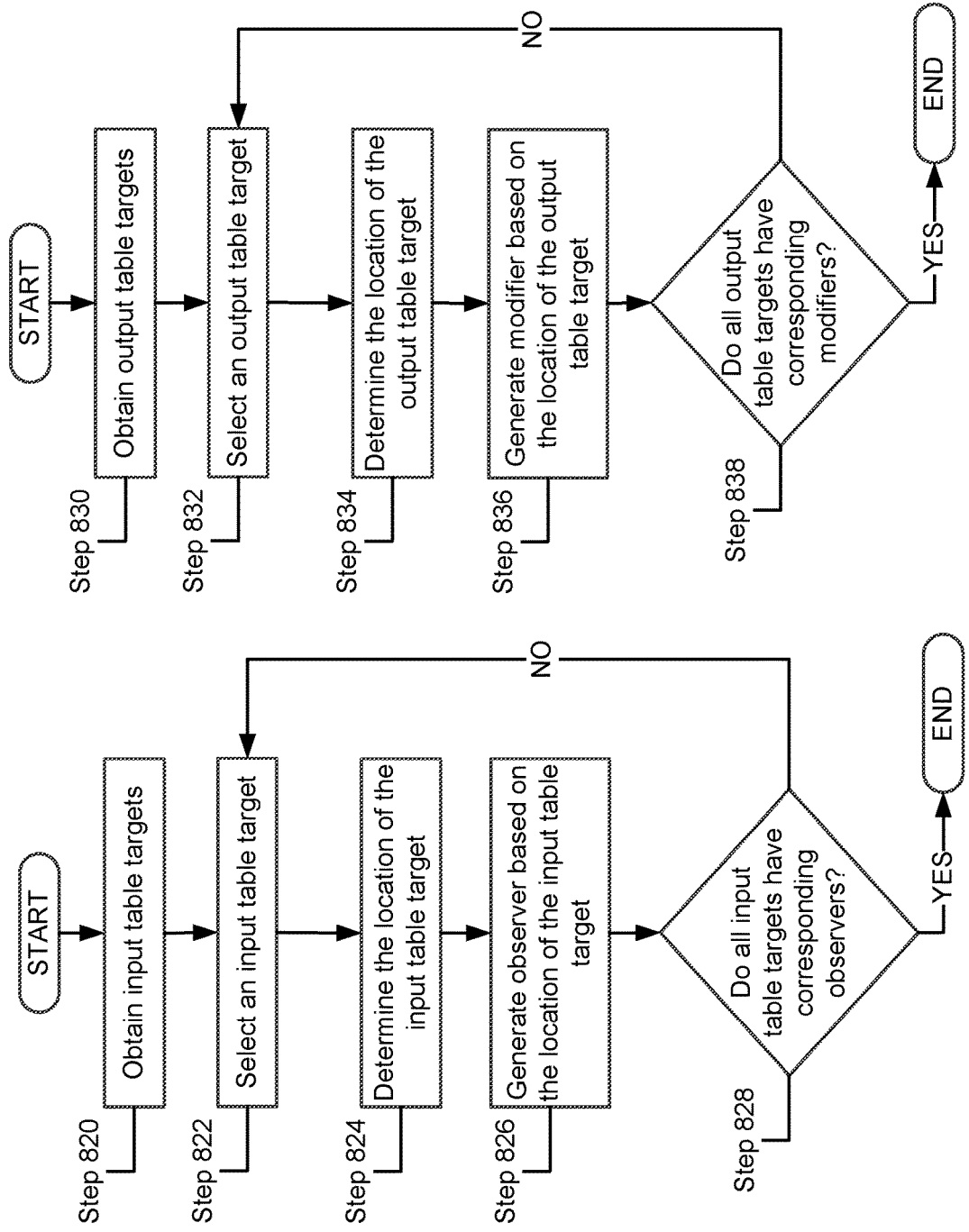

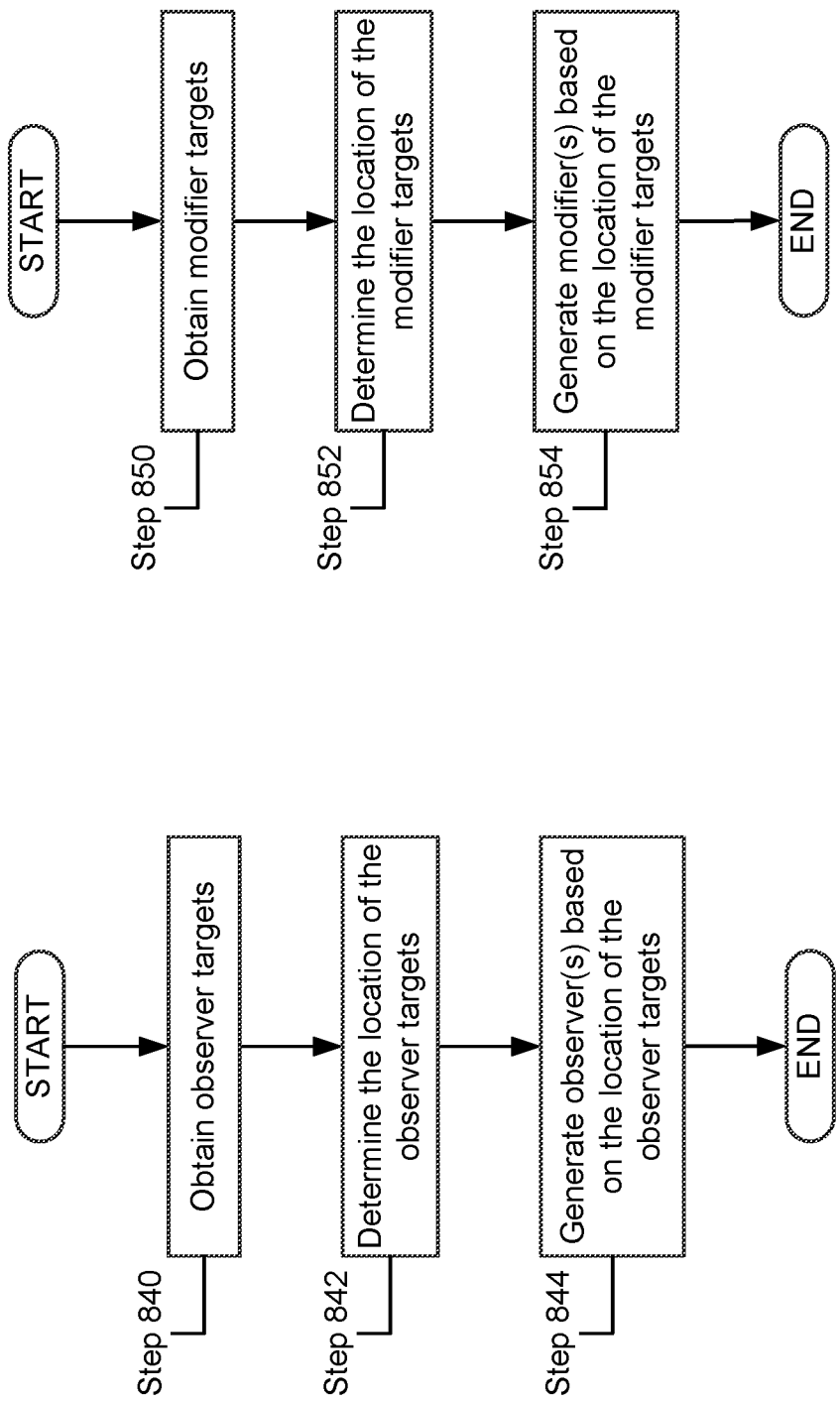

STANDING QUERIES IN MEMORY

BACKGROUND

Computing devices may store information in memory. In a network environment, multiple computing devices may interact as components of a system. Sometimes computing devices in a first location need to access information stored in the memory of a second computing device in a second location. Similarly, computing devices in a first location may need to write information to the memory of a second computing device.

SUMMARY

In one aspect, a network device in accordance with embodiments of the invention includes a database that includes a number of tables, an observer, and a query service (QS) manager. The observer monitors an element of a first table of the number of tables and provide a value of the element to a query instance of a number of query instances. The QS manager generate the number of query instances. The query instance of the number of query instances executes a compiled query in response to receiving the value.

In one aspect, a method of operating a network device in accordance with embodiments of the invention includes obtaining, by a query service manager (QSM) of the network device, a first query request comprising a query type, a constraint parameter, and an input; making a first determination, by the QS manager, that a first query service (QS) matches the first query request based on, at least in part, the query type; making a second determination, by the QS manager, that a first query instance of the QS matches the first query request based on, at least in part, the constraint parameter; and generating, by the QS manager, a first observer configured to observe an output of the first query instance based on the first determination and the second determination.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 8B shows a flowchart of a method of generating observers in accordance with one or more embodiments of the invention.

FIG. 8C shows a flowchart of a method of generating modifiers in accordance with one or more embodiments of the invention.

FIG. 8D shows a flowchart of a second method of generating observers in accordance with one or more embodiments of the invention.

FIG. 8E shows a flowchart of a second method of generating modifiers in accordance with one or more embodiments of the invention.

DETAILED DESCRIPTION

Figure 1A:
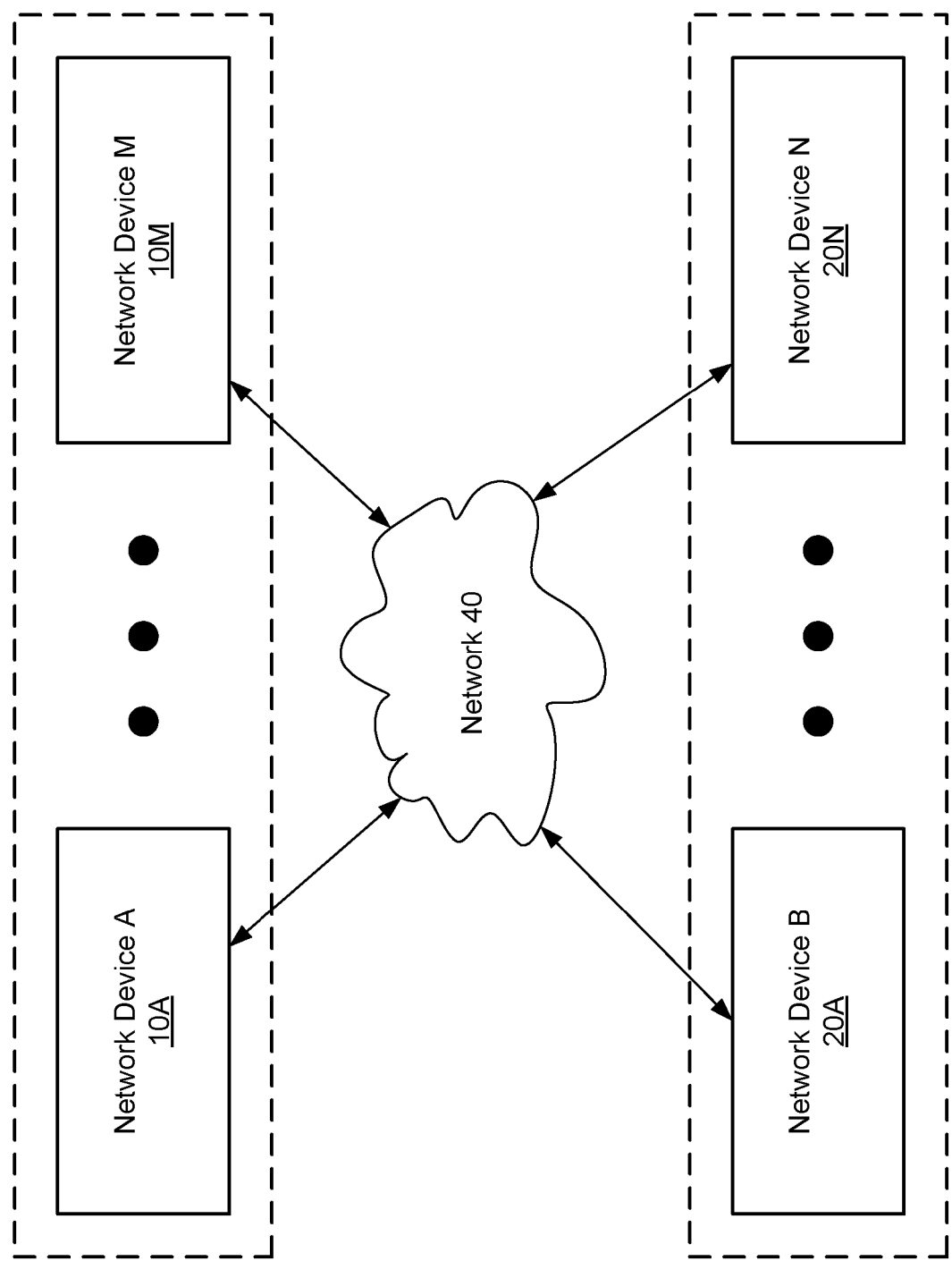
FIG. 1A shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In general, embodiments of the invention relate to methods and systems for storing and/or accessing information stored in one or more network devices. Each of the network devices may be a router, switch, multilayer switch, or other device that may support network communications or may interact with other devices through the network.

The stored information may relate to a state of the network device, a state of a network to which a network device is connected, and/or a state of one or more services operating on a network device. For example, the stored information may be a temperature of a component of the network device. The component may be, for example, a processor. In another example, the stored information may be an accessibility of another network device. The stored information may be other information without departing from the invention. In an additional example, the stored information may be a link status of a physical interface or a next-hop along a route of a packet.

A network device in accordance with one or more embodiments of the invention may include a database. The database may include tables that store information. In one or more embodiments of the invention, the database may span across multiple network devices, e.g., portions of the database may be stored on storage of a first network device and other portions of the database may be stored on storage of a second network device. In one or more embodiments of the invention, duplicate copies of information stored in the database may be stored on the first network device and the second network device. In one or more embodiments of the invention, a database planner may manage the consistency of the database across one or more network devices, e.g., may make copies of information stored on a first network device.

The network device may include a standing query service (SQS) manager. The SQS manager may generate and/or manage instances of SQSs that operate on information stored in the database. Instances of SQS may be generated in response to requests from other entities. In one or more embodiments of the invention, the other entities may be agents executing on the network device or agents executing on other network devices.

Each instance of a SQS may include an input table, a query, and an output table. In some embodiments of the invention, an instance of a SQS may include multiple input tables. An instance of the SQS may operate on entries of the input table to produce an output. In one or more embodiments of the invention, the instance of the SQS may generate an output in response to a change in an input table of the instance of the SQS. In one or more embodiments of the invention, the instance of the SQS may generate an output after one or more predetermined changes to the input table have occurred. In one or more embodiments of the invention, the instance of the SQS may produce an output at a predetermined time, e.g., periodically or at one or more predetermined times.

The entries of input tables of an instance of a SQS may be generated by observers. Observers may monitor entries of the database and/or output tables of other instances of SQSs and propagate changes to the database and/or output tables to input tables associated with the observer. Said another way, observers may monitor entries of the database/output tables/other data storage and propagate changes to the database/output tables/other data storage to an input table associated with another SQS. In one or more embodiments of the invention, observers may also propagate changes to entries of the database to one or more agents of the network device.

The output produced by the query of a SQS may be propagated to an output table through a modifier. Modifiers may assigned to monitor output generation by queries of instances of SQS and propagate the output to output tables in response to changes in the output of the query. In one or more embodiments of the invention, the output table may be a portion of the database, e.g., a table of the database or entries of a table of the database.

FIG. 1A shows an example of a network in accordance with one or more embodiments of the invention. The example network shown in FIG. 1A includes network devices (10A-10N) operably connected to one another. Each of the aforementioned network devices may be interconnected by a network (40) supporting one or more networking protocols. For example, network device 10A may be connected by operable communication links to network devices 10M, 20A, and 20N as indicated by the arrows. The network (40) may include any number of network devices without departing from the invention. Additionally, each of the aforementioned network devices may include any number of communication links without departing from the invention. In one embodiment of the invention, the network (40) may be the Internet. In another embodiment of the invention, the network (40) may be an intranet. The intranet may be connected to the Internet.

Figure 1B:
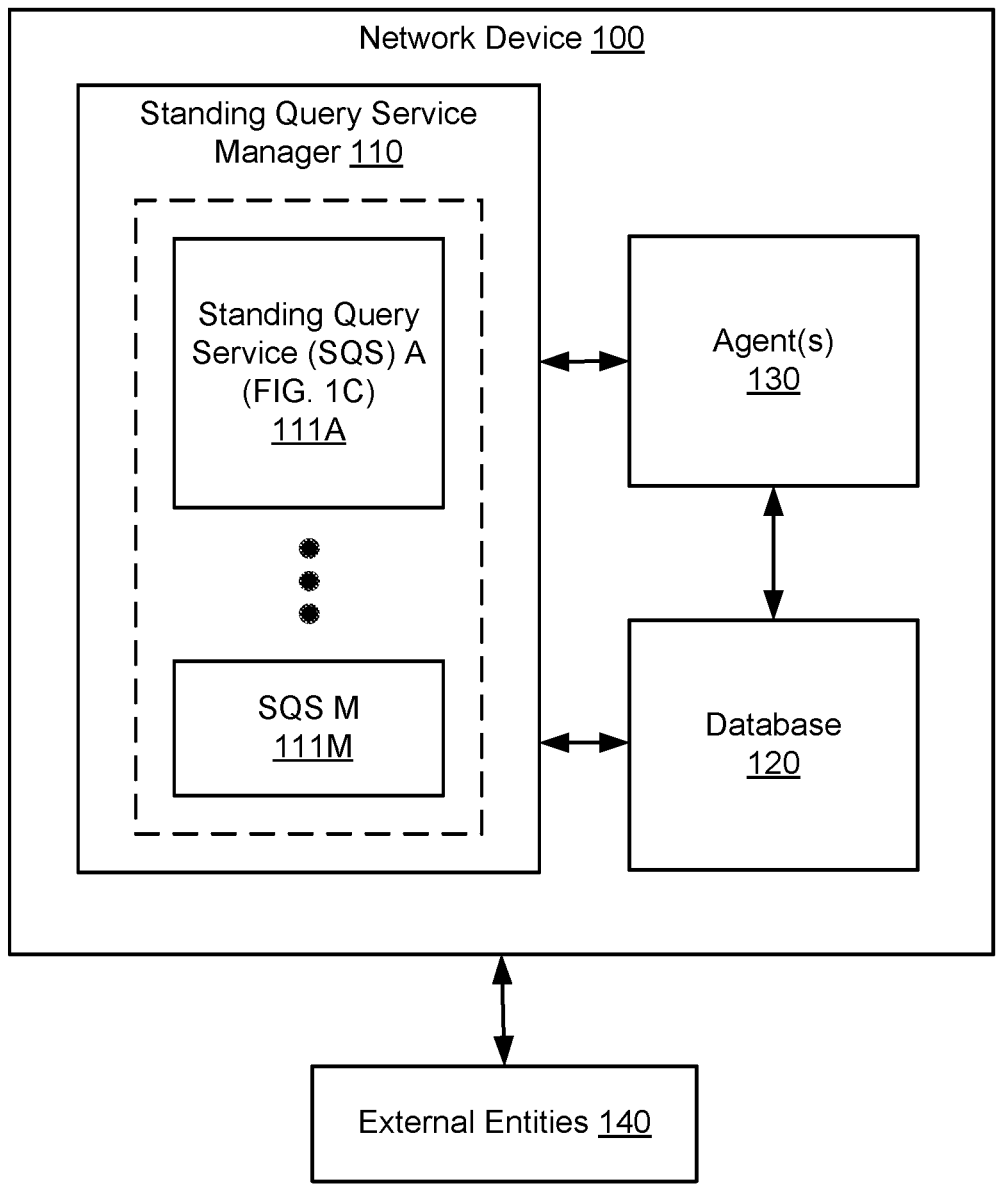
FIG. 1B shows a diagram of a network device in accordance with one or more embodiments of the invention.

FIG. 1B shows a network device (100) in accordance with one or more embodiments of the invention. The network device (100) may be configured to store information in a database (120) and generate outputs based on the information stored in the database (120) by one or more instances of SQSs.

The network device (100) may be a physical device that includes non-transitory storage, memory (e.g. Random Access Memory), and one or more processors. The non-transitory storage may include instructions which, when executed by the one or more processors, enable the network device (100) to perform the functions described in this application and shown in FIGS. 8A-9C.

The network device (100) may include a SQS manager (110), one or more standing query services (111A-111M), a database (120), and a one or more agents (130). The network device (100) may be operably connected to one or more entities (140). The entities (140) may be, for example, other network devices, servers, or computing devices accessible by a network. Each of the components of the network device (100) is described below.

The network device (100) may include a database (120). The database (120) may be a managed storage database that controls read and/or write access to information stored in the database. Read access to the database (120) may be provided by one or more observers and write access to the database may be provided by one or more modifiers. Observers and modifiers may be dynamically generated and removed. Observers and modifiers may be registered with the database (120) and thereby notify the database (120) of their presence. The interaction of observers and modifiers with the database are described in greater detail with respect to FIGS. 5-7.

Figure 2:
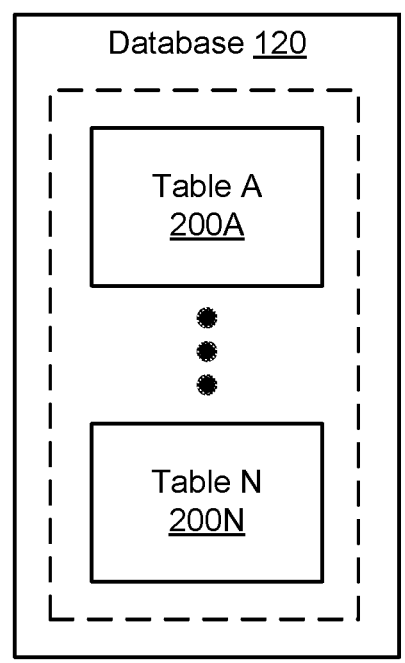
FIG. 2 shows a database accordance with one or more embodiments of the invention.
Figure 2:
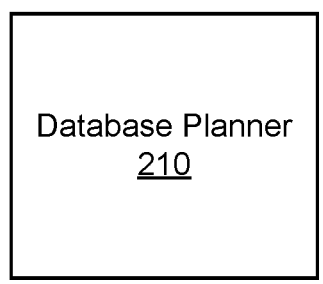

In one or more embodiments of the invention, the database (120) may include one or more tables (200A-200N) as shown in FIG. 2. The tables (200A-200N) may be data structures for storing information on a computer readable storage medium of the network device (100). Each element of each table may include one or more information elements. Information elements may be, for example, integers, characters, floating point values, addresses, or any other type of data.

Figure 5:
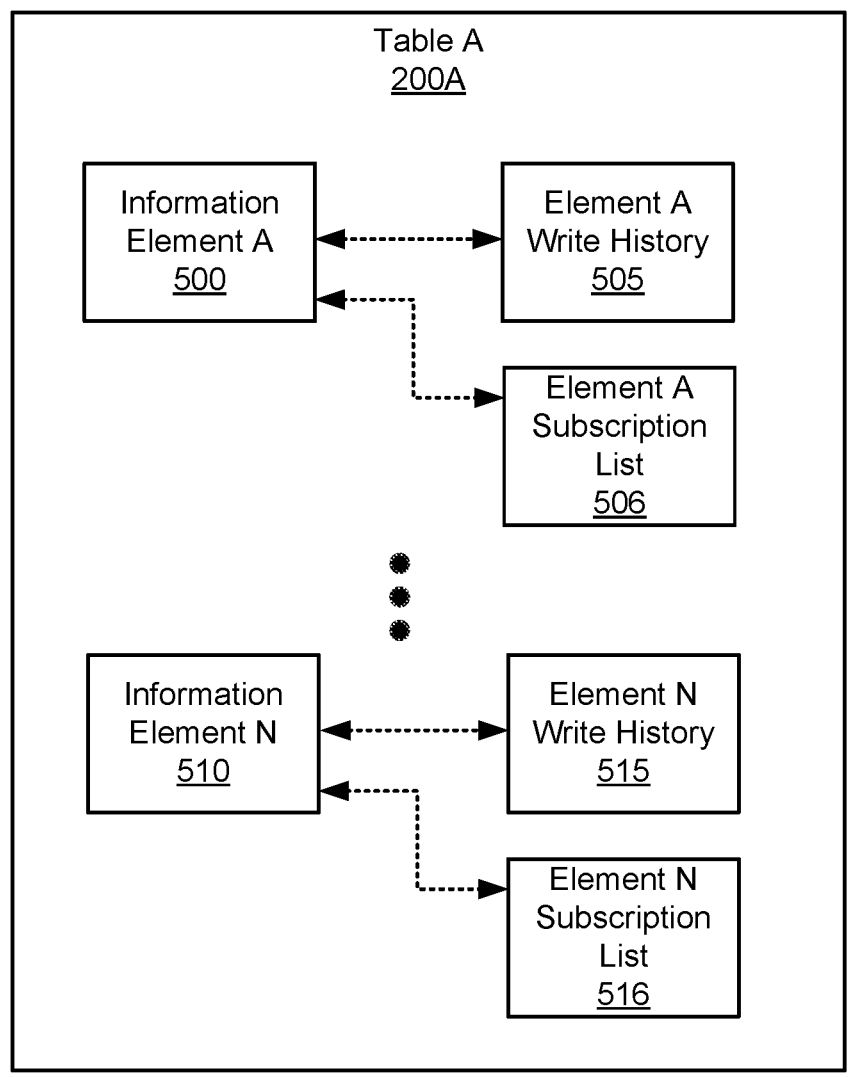
FIG. 5 shows a table of a database in accordance with one or more embodiments of the invention.

FIG. 5 shows an example of Table A (200A) in accordance with one or more embodiments of the invention. Table A (200A) includes a number of information elements (500, 510). As discussed above, each information element may include data of varying type.

In one or more embodiments of the invention, the database (120) may include a write history associated with each information element of each table of the database (120). The write history of an information element of a table may include a list of modifications, e.g., writes, to the element and the time of each modification. The list of modifications may include all of the modifications or a portion of the modifications. For example, information element A (500) may have an associated element A write history (505) that includes one or more modifications that have been made in a sequence to information element A (500). While the element A write history (505) is shown as being a part of Table A (200A) in FIG. 5, the write history of each information element of each table may be stored in other locations without departing from the invention.

In one or more embodiments of the invention, the database (120) may include a subscription list associated with each information element of each table of the database (120). The subscription list associated with each element may be a list of observers and/or modifiers, registered with the database, that interact with the associated information element. When an information element is updated, e.g., written to by a modifier, the database may notify each entity listed in the subscription list associated with the information element that the information element was updated.

While the write history and subscription list have been described as being associated with individual elements of the database, the write history and/or subscription list may be associated with collections of elements, entire tables, or other groupings of data stored in the database without departing from the invention.

In one or more embodiments of the invention, each subscription list associated with each information element of the database (120) may include a history list position of each observer. Observers may read information from the database at predetermined times, periodically, and/or in real-time in response to notifications of updates to information from the database (120). When an observer requests to read information from an information element of the database (120), the database (120) may return one or more modifications listed in the write history list, associated with the information element, having a write time that is later than a write time of the history list position. By sending one or more of the modifications having a write time that is later than the write time of the history list position, information written to the information element may be provided to the observer and thereby propagated to any requesting entities. The database (120) may update the history list position of the observer as the observer reads modifications from the history list. In other embodiments of the invention, each observer may maintain its own history list position rather than being stored in a table.

In one or more embodiments of the invention, when an observer requests to read information from an information element of the database (120), the database (120) may continue to return modifications until the history list position of the observer is updated to the most recent modification.

In an example, information element A (500) may have an associated element A subscription list (506) and information element N (510) may have an associated element N subscription list (516). Each of the subscription lists (506, 516) may include a listing of observers that are observing information elements A (500) and N (510), respectively. Each of the subscription lists (506, 516) may also include the history list position of each observer with respect to element A write history (505) and element N write history (515). The history list position of each observer with respect to each write history may be different, e.g., a first observer may have a history list position that is at a later time than a history list position of a second observer that is observing the same information element as the first observer. Thus, each information element may have a different subscription list and each entity listed in the subscription list may have a different history list location.

In one or more embodiments of the invention, the database (120) may remove elements of a write history of an information element when all of the entities subscribed to the information element have read the element. Removing the elements of the write history that have been read by all subscribed entities may reduce the storage requirements of the database.

While the element A subscription list (506) and element N subscription list (516) are shown as being a part of Table A (200A) in FIG. 5, the subscription list associated with each information element of each table may be stored in other locations without departing from the invention.

Figure 3:
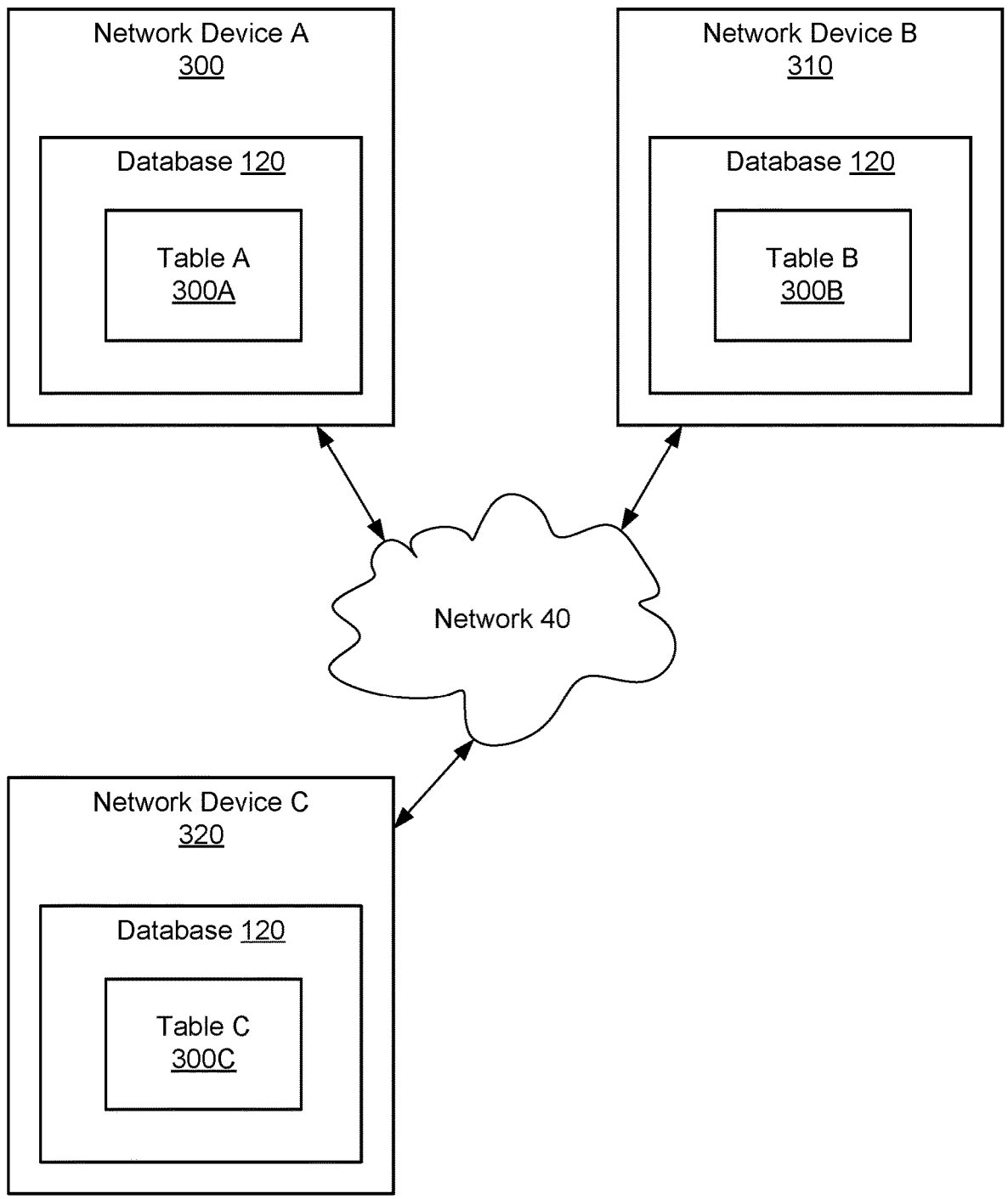
FIG. 3 shows a diagram of a database distributed across multiple network devices in accordance with one or more embodiments of the invention.
Figure 4:
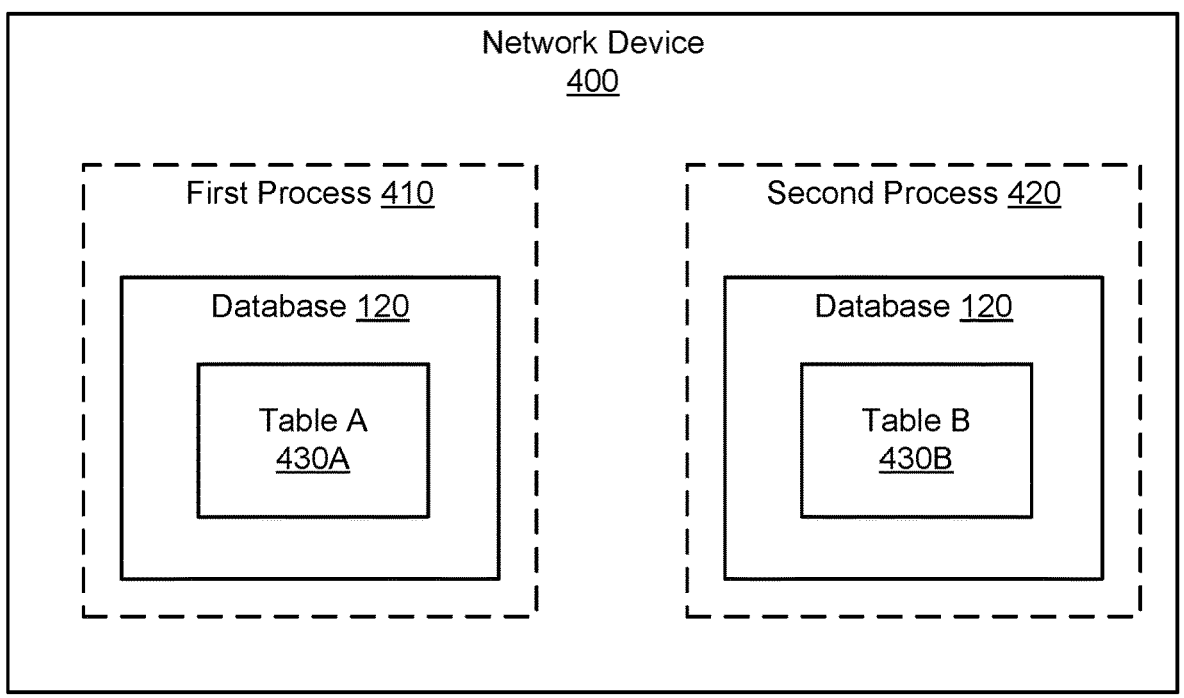
FIG. 4 shows a diagram of a database distributed across multiple processes in accordance with one or more embodiments of the invention.

Returning to FIG. 2, the database (120) may include tables (200A-200N) that are located on multiple network devices and/or are stored in multiple address spaces. FIGS. 3 and 4 illustrate examples of tables distributed across multiple devices and/or multiple address spaces.

In one or more embodiments of the invention, the database (120) may span across multiple network devices as shown in FIG. 3. FIG. 3 shows an example of a database (120) spanning across multiple network devices (300, 310, 320) connected by a network (40) in accordance with embodiments of the invention. The database (120) spans across each of the network devices and includes tables (300A, 300B, and 300C) stored on a computer readable storage medium of each network device, respectively. For example, Table A (300A) may be stored on a computer readable storage medium of network device A (300), Table B (300B) may be stored on a computer readable storage medium of network device B (310), and/or Table C (300C) may be stored on a computer readable storage medium of network device C (320). Each of the tables (300A, 300B, 300C) may include the same information, e.g., duplicate, or different information, e.g., non-duplicative. In some embodiments, each of the tables (300A, 300B, 300C) may include duplicate and non-duplicate information.

For example, each of the tables (300A, 300B, 300C) may include a first entry that comprises the maximum data transmission speed of the network (40). Table A (300A) may also include a second entry, not present in either Table B (300B) or Table C (300C), that comprises the current temperature of a processor of network device A (300).

In one or more embodiments of the invention, the database (120) may span across multiple processes in separate address spaces executing on a single network device. FIG. 4 shows an example of a database (120) spanning across a first process (410) and a second process (420) of a network device (400) in accordance with embodiments of the invention. The database (120) spans across each of the processes (410, 420) and includes tables (430A, 430B) stored on a computer readable storage medium of the network device (400). Table A (430A) and Table B (430B) may be stored in different address spaces allocated to the first process (410) and the second process (420), respectively. Each of the tables (430A, 430B) may include the same information, e.g., duplicate, or different information, e.g., non-duplicative. In some embodiments, each of the tables (430A, 430B) may include duplicate and non-duplicate information.

For example, each of the tables (430A, 430B) may include a first entry that comprises a maximum inter-process memory transport rate of the network device (400). Table A (430A) may also include a second entry, not present in Table B (430B), that comprises the quantity of storage allocated to the first process (410).

Returning to FIG. 2, the network device may include a database planner (210). The database planner (210) may manage the database (120). Managing the database (120) may comprise maintaining the location of each table of the database and facilitating inter network device and/or inter process memory transfers between tables of the database. For example, an agent present on a first network device may request to read data from a table that is present on a second network device. In response to the request from the agent, the database planner (210) may provide the location of the table on the second network device and thereby enable the agent to retrieve the data from the second table. In one or more embodiments of the invention, the database planner (210) may generate an observer, in response to requests from entities. The generated observer may retrieve data from a table of the database and provide the data to the requesting entity as describe with respect to FIG. 5. In some embodiments of the invention, managing the database (120) may include maintaining the location of each table of the database across shared memory.

In one or more embodiments of the invention, the database planner (210) may include a data structure, e.g., a list, tree, or other structure, that includes the location of each unique entry of the database (120). A unique entry may be an entry of a table where information is first written into the database (210). The information may be subsequently written to other entries of other tables of the database as duplicative information. The data structure may include the information necessary to determine the location of each unique entry of the database (120) and thereby enable data included in any entry of the database (120) to be retrieved and or duplicated to other tables of the database (120).

In one or more embodiments of the invention, the database planner (210) may be executing on the network device and comprise functionality to update each table of the database (120) in response to a change in an entry of the database. For example, the database planner (210) may include functionality to identify changes to entries of a first table of the database and propagate those changes to the other tables of the database by writing duplicative information to each of the other tables. In one or more embodiments of the invention, the database planner (210) may include functionality to monitor entries of a first table and notify other tables of changes to the entries of the first table. In response to the notification, the other tables may note that the entries of the first table have changed and may thereby notify, in response to requests from agents or other entities, the agents or other entities that entries of the first table have changed.

Thus, the database planner (210) may enable the database (120) to provide information to an agent or other entity of the location of any entry of any table of the database (120).

Returning to FIG. 1B, in one or more embodiments of the invention, the SQS manager (110) may include functionality to manage SQSs. The SQS manager (110) may manage one or more SQSs (111A-111m).

Managing SQSs may include generating instances of SQSs in response to requests from agents (130), generating observers associated with instances of the SQSs (111A-111M), and/or generating modifiers associated with the instances of the SQSs (111A-111M). The SQS manager (110) may generate instances of SQSs (111A-111M), observers, and modifiers based on information stored in or derived from the database (120) and/or a database planner (210, FIG. 2). Methods of managing the instances of the SQSs are further described with respect to FIGS. 8A-C and SQSs are further described with respect to FIGS. 6-7.

In one or more embodiments of the invention, the SQS manager (110) may be an embedded hardware device. The embedded hardware device may be, for example, a field programmable gate array (FPGA), application specific integrated circuit (ASIC), and/or digital signal processor (DSP). Other embedded hardware devices may be used without departing from the invention. In one or more embodiments of the invention, the embedded hardware device may be a component of an external entity (140) and provide the functionality by remotely communicating with the network device (100) by a network.

In one or embodiments, the SQS manager (110) may comprise instructions, stored on a non-transitory computer readable storage medium, that when executing on a processor of the network device (100) cause the network device (100) to perform the functionality of the SQS manager (110). In one or more embodiments of the invention, the SQS manager (110) may be executing on processors of external entities (140) and cause the network device (100) to perform the functionality of the SQS manager (110) by remotely communicating with the network device (100) by an operable connection.

Figure 6:
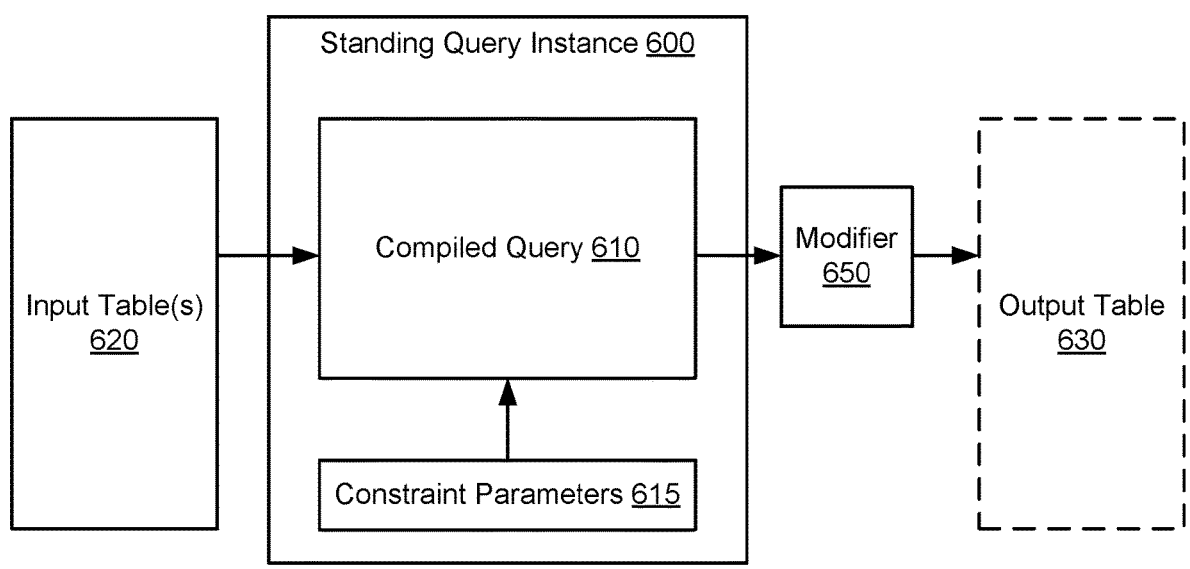
FIG. 6 shows a diagram of a standing query instance in accordance with one or more embodiments of the invention.

Each of the SQSs (111A-111M) may include one or more instances of a standing query (SQ). An example of a SQ instance (600) in accordance with one or more embodiments of the invention is shown in FIG. 6. The SQ instance (600) includes a compiled query (610) and one or more constraint parameters (615). Each of the components of the example SQ instance (600) is described below.

The SQ instance (600) may include a compiled query (610). The compiled query (610) may include instructions that, when executed by a processor, generate an output based on information included in an input table(s) (620) associated with the SQ instance (600) and constraint parameters (615) of the SQ instance (600). In one or more embodiments of the invention, the compiled query (610) may generate output in response to a change in value of one or more entries of the input table(s) (620). In one or more embodiments of the invention, the compiled query (610) may generate output at predetermined times. In one or more embodiments of the invention, the predetermined times may be periodic, e.g., the compiled query (610) may generate an output every five seconds.

The constraint parameters (615) may modify the manner in which the compiled query (610) generates an output, e.g., scales output, excludes input used to determined output, modifies weight of an input, etc.

The input table(s) (620) may be a data structure including one or more elements. The elements of the input table(s) (620) may be generated by one or more observers, as will be discussed in greater detail with respect to FIG. 7.

Output generated by the compiled query (610) may be sent to a modifier (650) associated with the SQ instance (600). The modifier (650) may propagate the output of the SQ instance (610) to the output table (630) associated with the SQ instance (600). The output table (630) will be discussed in greater detail with respect to FIG. 7.

Returning to FIG. 1B, the network device (100) may include one or more agents (130) executing on the network device (100) in accordance with one or more embodiments of the invention. The agents (130) may interact with the database (120) of the network device (100), e.g., the agents may desire to read and/or write data to and/or from the database (120). For example, the agents (130) may generate data to be stored in the database (120) or may need to read information from the database (120). In response to read or write requests from the agents (130), the database (120) and/or the database planner (210, FIG. 2) may generate observers or modifiers as required to facilitate the transfer of information between the database (120) and the agents (130).

The agents (130) may also interact with the SQS manager (110) of the network device (100). In some cases, an agent (130) may wish to determine information derived from information stored in the database (120). The agent (130) may send a request for a new instance of a SQ to the SQS manager (110) to determine the derived information. The SQS manager (110) may generate a new instance of the SQS in response to the request and one or more observers to propagate information generated by the new instance of the SQS to the agent (130).

Figure 7:
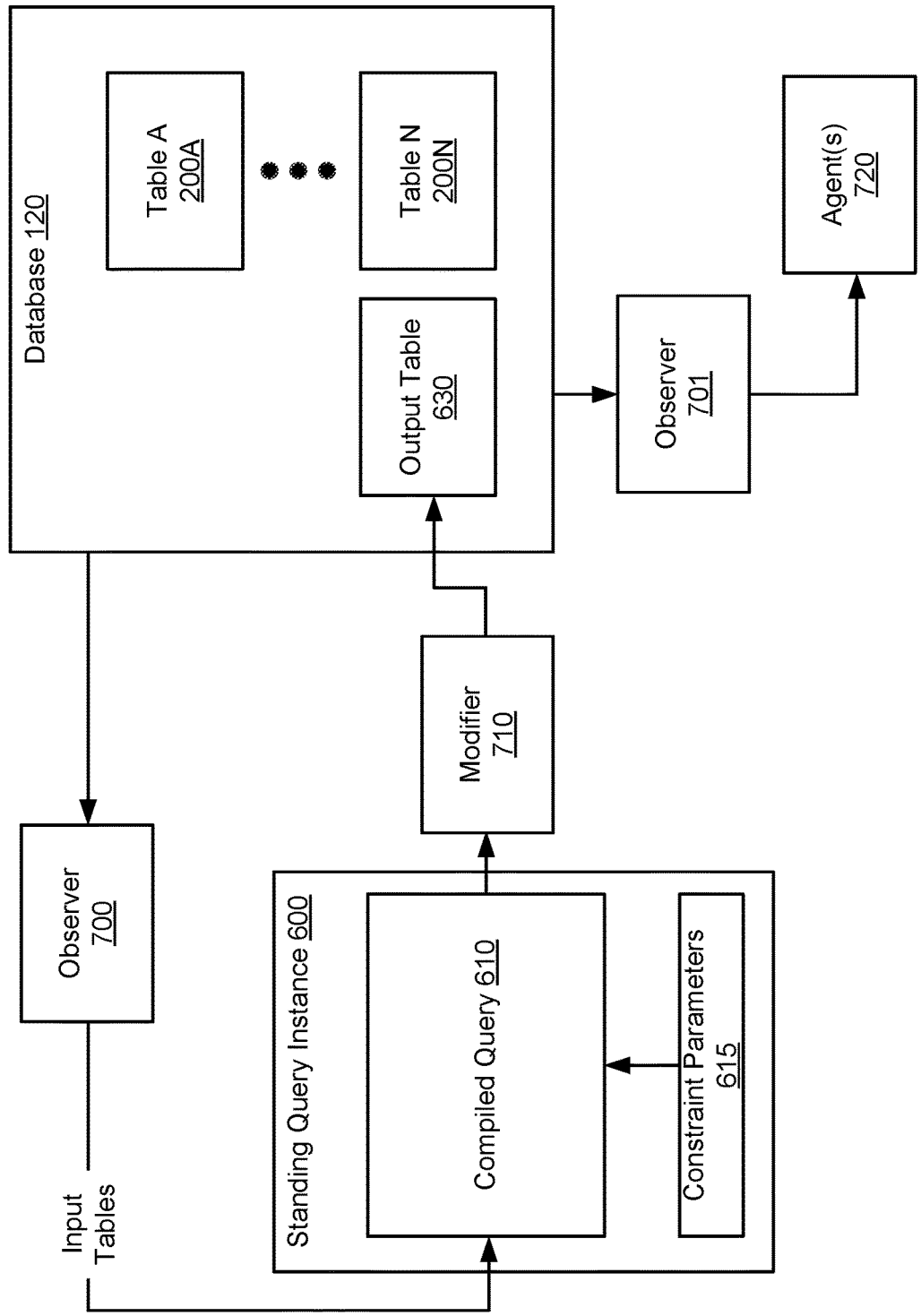
FIG. 7 shows a diagram of a standing query interacting with a database in accordance with one or more embodiments of the invention.

FIG. 7 shows the example of a SQ instance (600), shown in FIG. 6, interacting with a database (120) in accordance with one or more embodiments of the invention. In the example shown in FIG. 7, the SQ instance (600), observers (700, 701), and modifier (710) were generated in response to a request from an agent (720). The request included a query type to be generated, constraint parameters, and a list of one or more information elements of the database (120) to be used as input to the compiled query (610).

A first observer (700) was generated to read information from the database (120) and supply the information to the compiled query (610) via an input table. More specifically, the first observer (700) observes information elements stored in one or more tables (200A-200N) of the database and propagates the information to the compiled query (610). While the first observer (700) is illustrated as a single observer in FIG. 7, multiple observers may be used to propagate in information to the compiled query without departing from the invention. For example, multiple observers could each propagate information from different tables of the database (120).

A second observer (701) was generated to read output, generated by the compiled query (610), stored in the output table (630) associated with the SQ instance (600) and supply the output to the agent (720) requested the SQ instance (600).

A modifier (710) was generated to propagate output generated by the compiled query (610) to the output table (630). While the output table (630) is shown as a separate table in FIG. 7, the output table (630) may be a portion of any table of the database (120) without departing from the invention.

Thus, as shown in FIG. 7, SQ instances interacting with the database (120) read and write information to or from the database by observers and modifiers, respectively. Similarly, agents interacting with the database (120) also read and write information to or from the database by observers and modifiers.

Figure 8A:
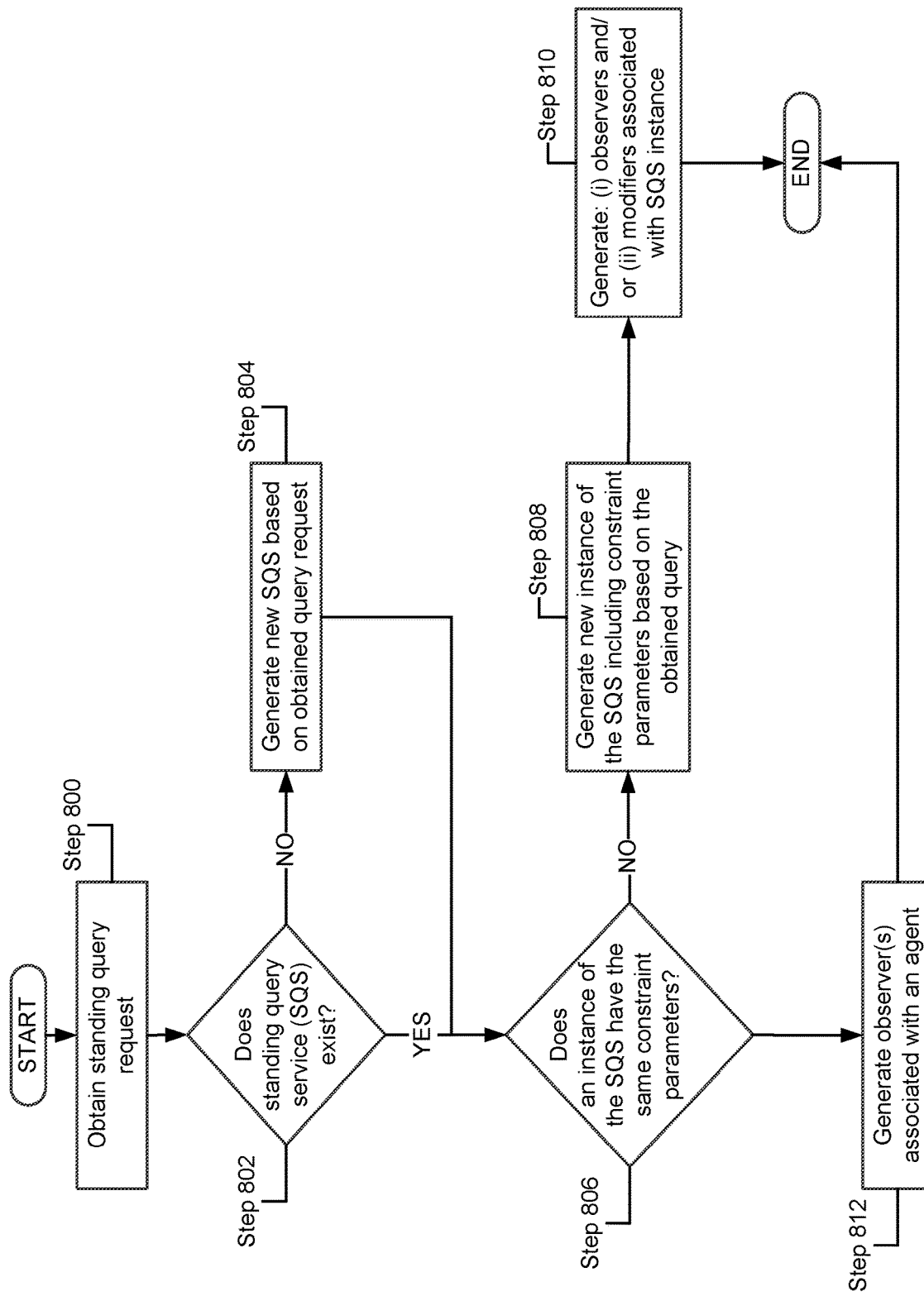
FIG. 8A shows a flowchart of a method of generating a standing query instance in accordance with one or more embodiments of the invention.

FIG. 8A shows a flowchart in accordance with one or more embodiments of the invention. The method depicted in FIG. 8A may be used to generate instances of SQSs in response to requests from agents in accordance with one or more embodiments of the invention. One or more steps shown in FIG. 8A may be omitted, repeated, and/or performed in a different order among different embodiments.

In Step 800, a SQS manager of a network device obtains a request for a new instance of a SQS. The SQS manager may obtain the request from a message from an agent. The agent may be executing on the network device on which the SQS manager is executing. The request may specify a query type, one or more constraint parameters, and information stored in a database on which the new instance of the SQS is to operate.

In Step 802, the SQS manager determines whether a SQS matching the query type included in the request exists on the network device. If the query type does not match an existing SQS, the method proceeds to Step 804. If the query type does match an existing SQS, the method proceeds to Step 806.

In Step 804, the SQS manager generates a new SQS based on the obtained query request. Specifically, the SQS manager may generate a new SQS including the query type indicated in the obtained query request.

In one or more embodiments of the invention, generating a new SQS may include compiling a query. In one or more embodiments of the invention, generating a new SQS may include linking compiled byte code.

In Step 806, the SQS manager determines whether the constraint parameters of an instance of a SQS matches the constraint parameters, included in the obtained request, exists on the network device. If the constraint parameters of the obtained request do not match the constraint parameters of an existing instance of a SQS, the method proceeds to Step 808. If the constraint parameters of the obtained request do match the constraint parameters of an existing instance of a SQS, the method proceeds to Step 812.

In Step 808, the SQS manager generates a new SQ instance of the SQS, corresponding to the query type included in the obtained request, including constraint parameters based on the constraint parameters included in the obtained request. Specifically, the SQS manager may make a copy of the compiled query associated with the SQS corresponding to the query type included in the obtained request and constraint the compiled query based on the constraint parameters included in the obtained request.

In one or more embodiments of the invention, the constraint parameters change the behavior of the compiled query. The constraint parameters may be variables, utilized by the compiled query, which change the output produced by the compiled query when operating on the same input.

In Step 810, the SQS manager generates observers and/or modifiers associated with the new SQ instance. The SQS manager may generate one or more observers associated with the new SQ instance that supplies the compiled query of the new SQ instance with data on which the compiled query operates. The observers may supply the data to an input table of the new SQ instance as shown, for example, in FIG. 7. The SQS manager may also generate one or more modifiers associated with the SQ instance that propagates output generated by the compiled query of the SQ instance. The modifiers may propagate the output generated by the compiled query to an output table associated with the new instance of the SQS.

In one or more embodiments of the invention, the SQS manager may generate one or more observers associated with an agent from which the request was obtained in Step 800. The observer may be linked with the output table where data generated by the compiled query is stored and the agent from which the request was obtained in Step 800. The observer may propagate changes to the output table to the agent and thereby notify the agent of new output generated by the new instance of the SQ instance requested by the agent.

Returning to Step 806, the method may proceed to Step 812 if an existing SQ instance includes constraint parameters that are the same as those included in the SQ request obtained in Step 800.

In Step 812, the SQS manager generates observer(s) associated with an agent from which the new SQS request was obtained in Step 800. The observer may be linked with the output table where data generated by the existing SQ instance identified in Step 806 is stored and the agent from which the request was obtained in Step 800. The observer may propagate changes to the output table to the agent and thereby notify the agent of new output generated by the existing instance of the SQS. In other words, if an existing SQ instance includes the same constraint parameters as those of the request, an observer may be generated to propagate results of the existing SQ instance to the agent rather than generating a new SQ instance and a new modifier.

In one or more embodiments of the invention, the observer may propagate changes to the output table to an agent in response to a notification from the database that the element of the database the observer is observing, e.g., one or more elements of the output table, have changed.

In one or more embodiments of the invention, the observer may poll the database at predetermined times to determine if the observed elements of the database have changed. If the database indicates the observed elements of the database have changed, the observer may receive each modification to the observed elements from the database and propagate the modifications to the agent from which the SQ request was obtained in Step 800. In one or more embodiments of the invention, the predetermined times may be periodic, e.g., every 5 seconds. In one or more embodiments of the invention, the predetermined times may be intermittent.

Thus, the methods shown in FIG. 8A may be used to generate observers, modifiers, and SQ instances in response to requests from agents.

FIG. 8B shows a flowchart in accordance with one or more embodiments of the invention. The method depicted in FIG. 8B may be used to generate observers in response to requests for SQ instances from agents in accordance with one or more embodiments of the invention. One or more steps shown in FIG. 8B may be omitted, repeated, and/or performed in a different order among different embodiments.

In Step 820, a SQS manager of a network device obtains one or more input table targets. The input table targets may be one or more elements of a database on which a requested SQ instance is to operate. The input table targets may be obtained from a request from an agent requesting the SQ instance.

In Step 822, the SQS manager selects one of the input table targets.

In Step 824, the SQS manager determines the location of the input table target selected in Step 822. The SQS manager may determine the location of the input table by target by requesting the location from a database planner (210, FIG. 2) that manages the database (120, FIG. 2). The location of the input table target may be an entry of a table of the database (120, FIG. 2).

In Step 826, the SQS manager generates an observer based on the location of the input table target. The location of the input table target may be located in the same address space as the input table of the SQ instance, located in a different address space than the input table of the SQ instance, or located in a different address space of a different network device than the input table of the SQ instance. The SQS manager may generate observers linked to memory transport protocols and/or inter-device memory transport protocols to facilitate propagating information from the database to the input table of a SQ instance.

For example, if an input table is located in a different address space than the input table of the SQ instance, the SQS manager may generate a first observer, in the address space of the input table target, linked to a memory transport protocol between the address space of the input table target and the address space of the input table. The SQS may generate a second observer, in the address space of the input table, linked to the memory transport protocol between the address space of the input table target and the address space of the input table and thereby propagate changes to the input table target to the input table.

In a second example, if an input table is located in a different address space of a different network device, the SQS manager may generate a first observer, in the address space of the different network device of the input table target, linked to an inter-device memory transport protocol between the different network device and the network device on which the input table exists. The SQS may generate a second observer, in the address space of the input table, linked to the inter-device memory transport protocol between the different network device and the network device on which the input table exists and thereby propagate changes to the input table target to the input table.

In Step 828, the SQS manager determines whether all input table targets are observed by observers. If all input table targets are observed by observers, the method may end. If all input table targets are not observed by observers, the method may proceed to Step 822.

Thus, the method shown in FIG. 8B may be used to generate observers to propagate changes to input table targets located in a database to an input table of a SQ instance.

While the method shown in FIG. 8B is illustrated as generating unique observers for each input table target, one of ordinary skill in the art will appreciate that the method may be implemented by utilizing a single observer that observes multiple input table without departing from the invention.

FIG. 8C shows a flowchart in accordance with one or more embodiments of the invention. The method depicted in FIG. 8C may be used to generate modifiers in response to requests for SQ instances from agents in accordance with one or more embodiments of the invention. One or more steps shown in FIG. 8C may be omitted, repeated, and/or performed in a different order among different embodiments.

In Step 830, a SQS manager of a network device obtains one or more output table targets. The output table targets may be one or more elements of a database on which a requested SQ instance is to propagate its output. The output table targets may be obtained from a request from an agent requesting the SQ instance.

In Step 832, the SQS manager selects one of the output table targets.

In Step 834, the SQS manager determines the location of the output table target selected in Step 832. The SQS manager may determine the location of the output table target by requesting the location from a database planner (210, FIG. 2) that manages the database (120, FIG. 2). The location of the output table target may be an element of a table of the database (120, FIG. 2).

In Step 836, the SQS manager generates a modifier based on the location of the output table target. The modifier may write data received from the SQ instance to the location of the output table target, e.g., one or more elements of a table of the database.

In Step 838, the SQS manager determines whether all output table targets have associated modifiers. If all output table targets have associated modifiers, the method may end. If all output table targets do not have associated modifiers, the method may proceed to Step 832.

Thus, the method shown in FIG. 8C may be used to generate modifiers to propagate output generated by the SQ instance to an output table of a database.

While the method shown in FIG. 8C is illustrated as generating unique modifiers for each output table target, one of ordinary skill in the art will appreciate that the method may be implemented by utilizing a single modifier associated with all of the output table targets without departing from the invention.

As discussed with respect to FIGS. 8B and 8C, observers and modifiers may be employed to read and/or write data to and/or from a database by a SQ instance. Similarly, observers and modifiers may be employed to read and/or write data to and/or from a database by an agent.

FIG. 8D shows a flowchart in accordance with one or more embodiments of the invention. The method depicted in FIG. 8D may be used to generate observers in response to requests to read data from a database by an agent in accordance with one or more embodiments of the invention. One or more steps shown in FIG. 8D may be omitted, repeated, and/or performed in a different order among different embodiments.

In Step 840, a database may obtain one or more observer targets. The database may obtain the observer targets based on a request from an agent. The request may include one or more elements of the database. The elements of the database may be the observer targets.

In Step 842, the database may determine the location of the observer targets. The database may determine the location of the observer targets by requesting the location of each observer target from a database planner (210, FIG. 2).

In Step 844, the database may generate one or more observers based on the location of the observed targets. As described with respect to FIG. 8B, multiple observers and/or memory transport may be used to propagate information from the observed targets of the database to the agent that requests the targets be observed in Step 840.

FIG. 8E shows a flowchart in accordance with one or more embodiments of the invention. The method depicted in FIG. 8E may be used to generate modifiers in response to requests to write data to a database by an agent in accordance with one or more embodiments of the invention. One or more steps shown in FIG. 8E may be omitted, repeated, and/or performed in a different order among different embodiments.

In Step 850, a database may obtain one or more modifier targets. The database may obtain the modifier targets based on a request from an agent. The request may include one or more elements of the database.

In Step 852, the database may determine the location of the modifier targets. The database may determine the location of the modifier targets by requesting the location of each modifier target from a database planner (210, FIG. 2).

In Step 854, the database may generate one or more modifiers based on the location of the modifier targets.

Figure 9A:
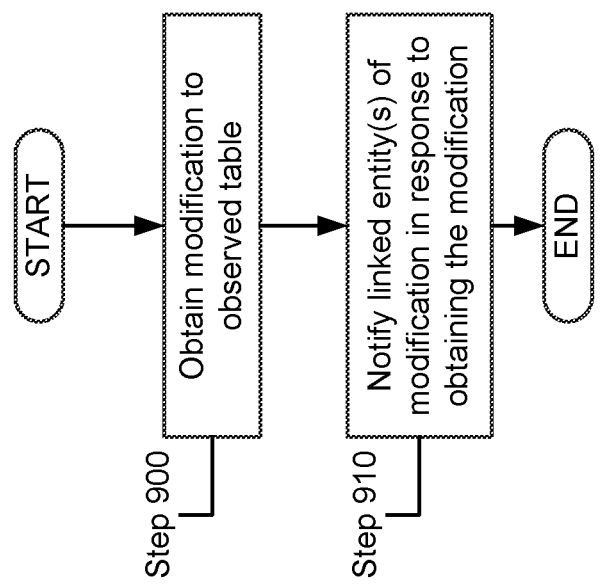
FIG. 9A shows a flowchart of a method of obtaining modifications to a table in accordance with one or more embodiments of the invention.

FIG. 9A shows a flowchart in accordance with one or more embodiments of the invention. The method depicted in FIG. 9A may be used by an observer to notify a linked entity of a change to an observed element of a database in accordance with one or more embodiments of the invention. One or more steps shown in FIG. 9A may be omitted, repeated, and/or performed in a different order among different embodiments.

In Step 900, an observer may obtain a modification to an observed table. As described with respect to FIG. 5, each element of each table may include a subscription list. When an element of a table of a database is modified, the database may notify each observer listed in the subscription list of the modification. The observer may obtain the modification by the notification of change provided by the database.

In one or more embodiments of the invention, the observer may periodically poll the database to determine whether an observed element of a table has been modified. The observer may determine whether the observed element of the table of the database has been modified based on the write history of the element. In other words, the observer may review the write history of the element since the element was last observed by the observer for modification.

In Step 910, the observer may notify any linked entities of the modifications obtained in Step 900. As described with respect to FIGS. 7 and 8A, an observer may be linked to one or more entities. The entities may be input tables of SQ instances, agents, or any other consumer of information. The observer may notify each linked entity of the modification of the element of the database the observer is observer is observing.

Figure 9B:
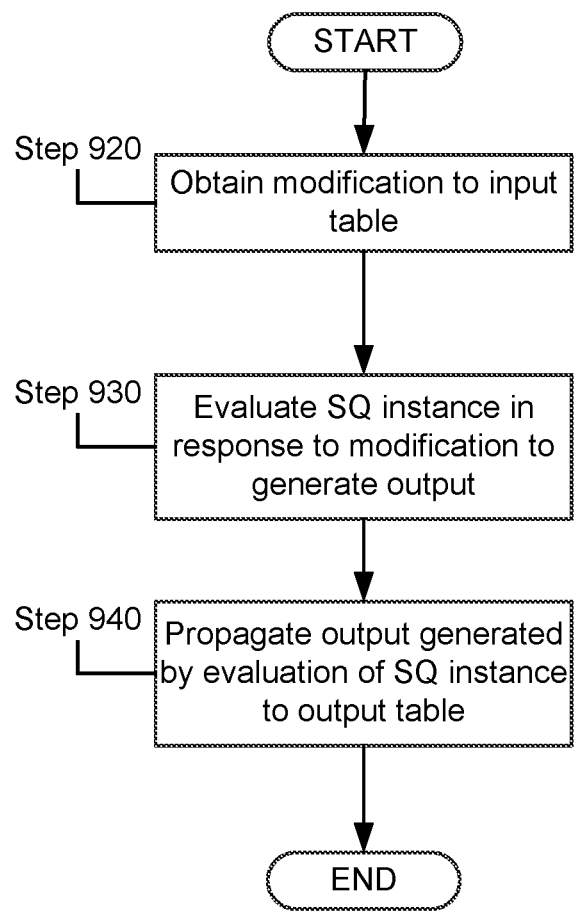
FIG. 9B shows a flowchart of a method of evaluating a standing query (SQ) instance in accordance with one or more embodiments of the invention.

FIG. 9B shows a flowchart in accordance with one or more embodiments of the invention. The method depicted in FIG. 9B may be used by a SQ instance to evaluate a SQ in accordance with one or more embodiments of the invention. One or more steps shown in FIG. 9B may be omitted, repeated, and/or performed in a different order among different embodiments.

In Step 920, a SQ instance may obtain a modification to an input table. The modification may be obtained by an observer performing the method shown in FIG. 9A.

In Step 930, the SQ instance may execute the compiled query of the SQ in response to the modification. Executing the compiled query may generate output.

In Step 940, the SQ instance may propagate output generated by evaluation of the SQ instance to an output table. The output generated by the SQ instance may be propagated to an output table by the method shown in FIG. 9C.

Figure 9C:
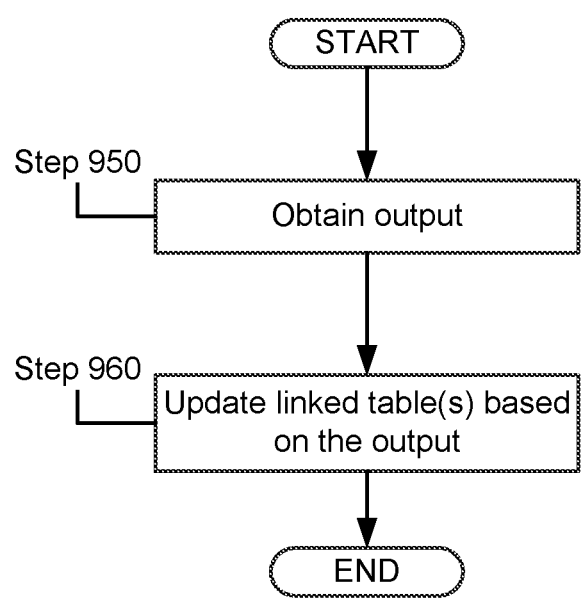
FIG. 9C shows a flowchart of a method of propagating output to a table in accordance with one or more embodiments of the invention.

FIG. 9C shows a flowchart in accordance with one or more embodiments of the invention. The method depicted in FIG. 9C may be used by a modifier to propagate output in accordance with one or more embodiments of the invention. One or more steps shown in FIG. 9C may be omitted, repeated, and/or performed in a different order among different embodiments.

In Step 950, a modifier may obtain an output. The modifier may obtain the output from a compiled query of a SQ instance, an agent, or any other entity.

In Step 960, the modifier updates one or more linked tables based on the obtained output.

The following examples are for explanatory purposes and are not intended to limit the scope of the technology.

Example 1

Figure 10:
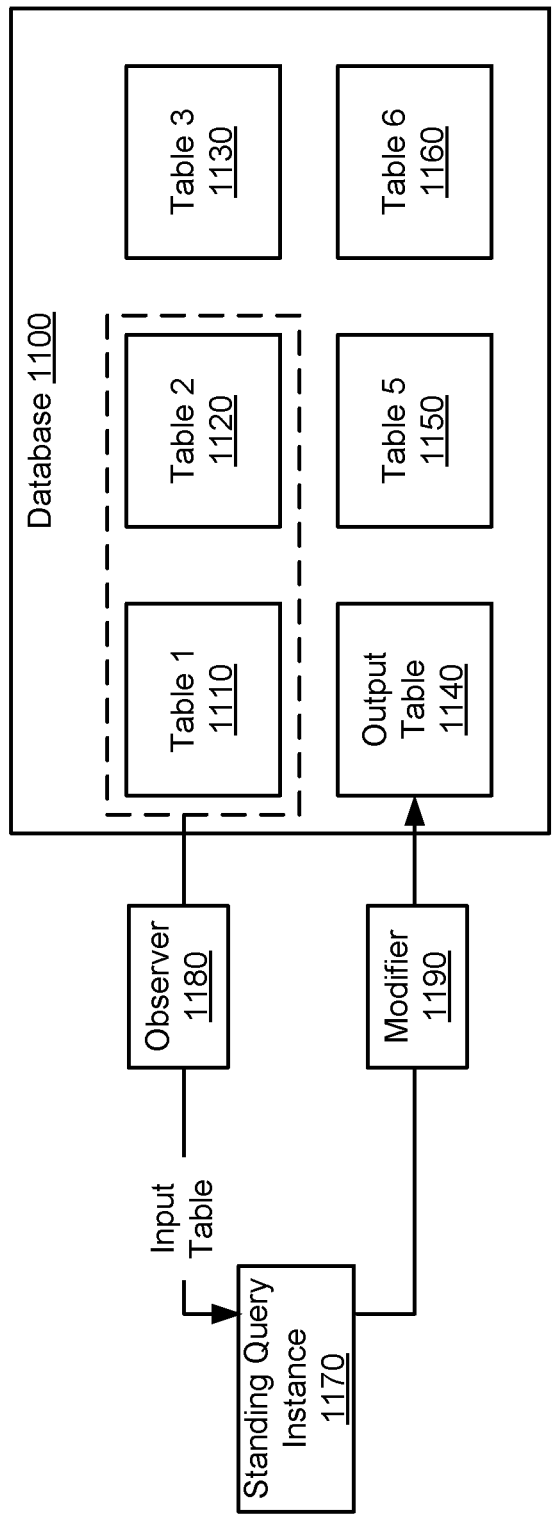
FIG. 10 shows a first example of a database in accordance with one or more embodiments of the invention.

A network device may include a database (1100) as shown in FIG. 10. The database (1100) may include six tables (1110, 1120, 1130, 1140, 1150, 1160). An agent (not shown) may request a SQ instance be generated. In response to the request, a SQS manager of the network device may perform the method shown in FIG. 8A and generate a SQ instance (1170), an observer (1180), and a modifier (1190). Upon generation, the observer (1180) and modifier (1190) may register with the database (1100), as described with respect to FIG. 5.

The request from the agent may indicate that the SQ instance is to operate on elements of Table 1 (1110) and Table 2 (1120). Based on the request, the SQS manager may configure the observer (1180) to observe elements of the Table 1 (1110) and Table 2 (1120), as indicated by the dashed box.

The request from the agent may also indicate that the output generated by the SQ instance should be stored in output table (1140) in the database. Based on the request, the SQS manager may configure the modifier (1190) to propagate results generated by the SQ instance to elements of the output table (1190).

When elements of Table 1 (1110) or Table 2 (1120) observed by the observer (1180) are modified, the database (1100) will notify the observer (1180) of the modifications and thereby the modifications are propagated to the input table of the SQ instance (1170). While illustrated as a single observer in FIG. 10, observer (1180) may be multiple observers, e.g., aggregated observers. Each of the observers may observer one of table 1 (1110) and table 2 (1120). In response to the modification of the input table, the SQ instance (1170) will execute the compiled query of the SQ instance (1170) and thereby generate output. The output generated by the compiled query of the SQ instance (1170) is forwarded to the modifier (1190) which subsequently propagates the output to elements of the output table (1140).

Example 2

Figure 11:
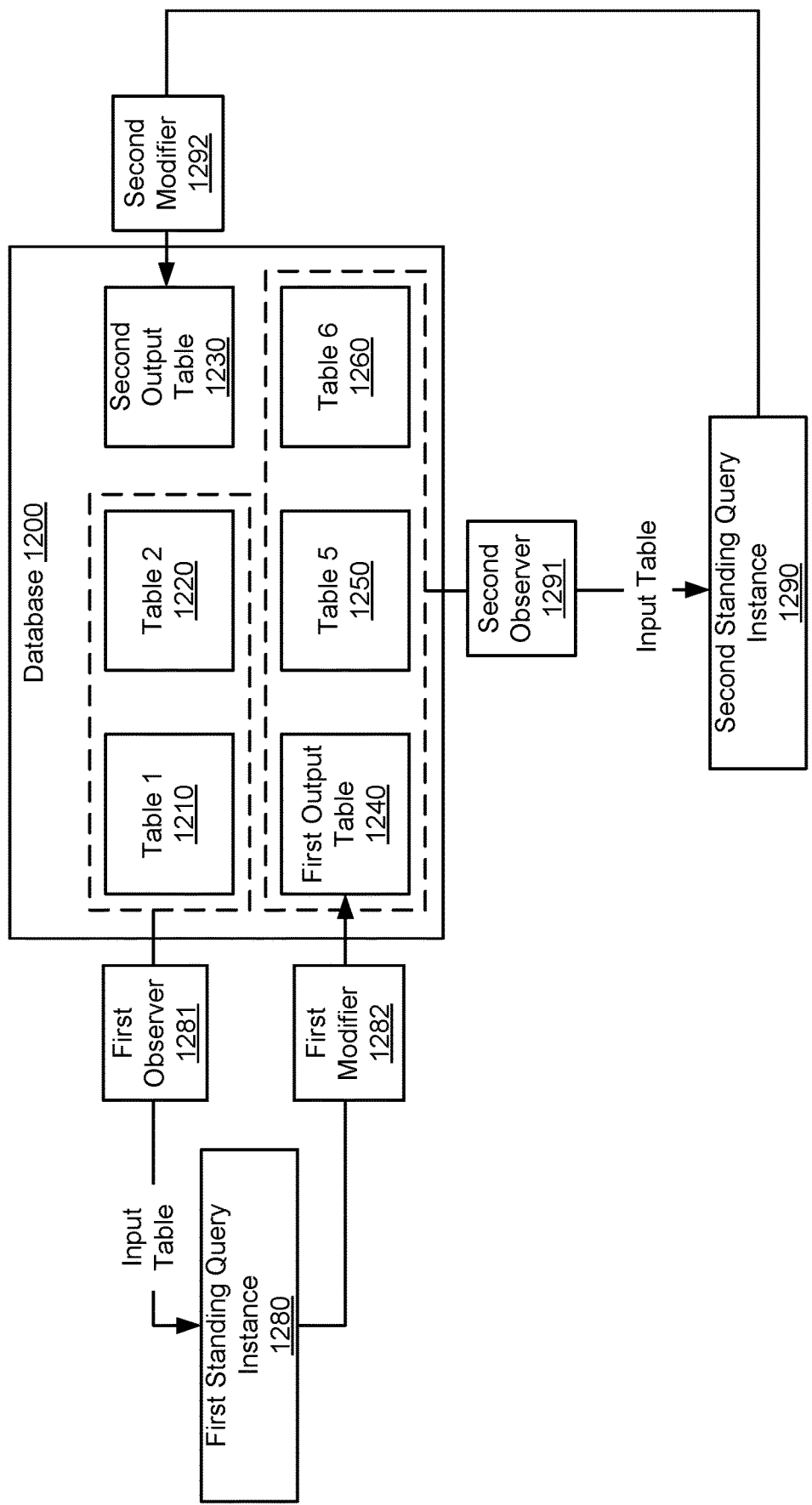
FIG. 11 shows a second example of a database in accordance with one or more embodiments of the invention.

A network device may include a database (1200) as shown in FIG. 11. The database (1200) may include six tables (1210, 1220, 1230, 1240, 1250, 1260). An agent (not shown) may request a first SQ instance be generated. In response to the request, a SQS manager of the network device may perform the method shown in FIG. 8A and generate a first SQ instance (1280), a first observer (1281), and a first modifier (1282). Upon generation, the first observer (1281) and first modifier (1282) may register with the database (1200), as described with respect to FIG. 5.

While illustrated as a single observer in FIG. 11, observer (1281) may be multiple observers, e.g., aggregated observers. Each of the observers may observer one of table 1 (1210) and table 2 (1220).

The request from the agent may indicate that the first SQ instance (1280) is to operate on elements of Table 1 (1210) and Table 2 (1220). Based on the request, the SQS manager may configure the first observer (1281) to observe elements of the Table 1 (1210) and Table 2 (1220), as indicated by the dashed box.

The request from the agent may also indicate that the output generated by the SQ instance should be stored in a first output table (1240) in the database. Based on the request, the SQS manager may configure the first modifier (1282) to propagate results generated by the SQ instance to elements of the first output table (1282).

The agent (or a different agent or entity) may request a second SQ instance be generated. In response to the request, a SQS manager of the network device may perform the method shown in FIG. 8A and generate a second SQ instance (1290), a second observer (1291), and a second modifier (1292). Upon generation, the second observer (1291) and second modifier (1292) may register with the database (1200), as described with respect to FIG. 5.

While illustrated as a single observer in FIG. 11, observer (1291) may be multiple observers, e.g., aggregated observers. Each of the observers may observer one of the first output table (1240), table 5 (1250), and table 6 (1260).

The request from the agent may indicate that the second SQ instance (1290) is to operate on elements of the first output table (1240), Table 5 (1250), and Table 6 (1260). More specifically, the request may indicate that the second SQ instance (1290) is to operate on elements of the first output table (1240) that will store output generated by the first SQ instance (1280). Based on the request, the SQS manager may configure the second observer (1291) to observe elements of the first output table (1240), Table 5 (1250), and Table 6 (1260), as indicated by the dashed box.

The request from the agent may also indicate that the output generated by the second SQ instance (1290) should be stored in a second output table (1230) in the database. Based on the request, the SQS manager may configure the second modifier (1292) to propagate results generated by the SQ instance to elements of the second output table (1292).

When elements of Table 1 (1210) or Table 2 (1220) observed by the first observer (1281) are modified, the database (1200) notifies the first observer (1281) of the modifications and thereby propagates the modifications to the input table of the first SQ instance (1280). In response to the modification of the input table, the first SQ instance (1280) executes the compiled query of the first SQ instance (1280) and thereby generate output. The output generated by the compiled query of the first SQ instance (1280) is forwarded to the first modifier (1282) which propagates the output to elements of the first output table (1240).

When the output of the first SQ instance (1280) is propagated to the first output table (1240), the database notifies the second observer (1291) of the modifications to the observed elements of the first output table (1240). In response to the notification, the second observer (1291) propagates the modifications to the observed elements to the input table of the second SQ instance (1290). Thus, the output table (1240) serves as an input table for the second standing query instance (1290). In response to the modification of the input table, the second SQ instance (1290) executes the compiled query of the second SQ instance (1290) and thereby generates output. The output generated by the compiled query of the second SQ instance (1290) is forwarded to the second modifier (1292) which propagates the output to elements of the second output table (1230).

Example 3

Figure 12:
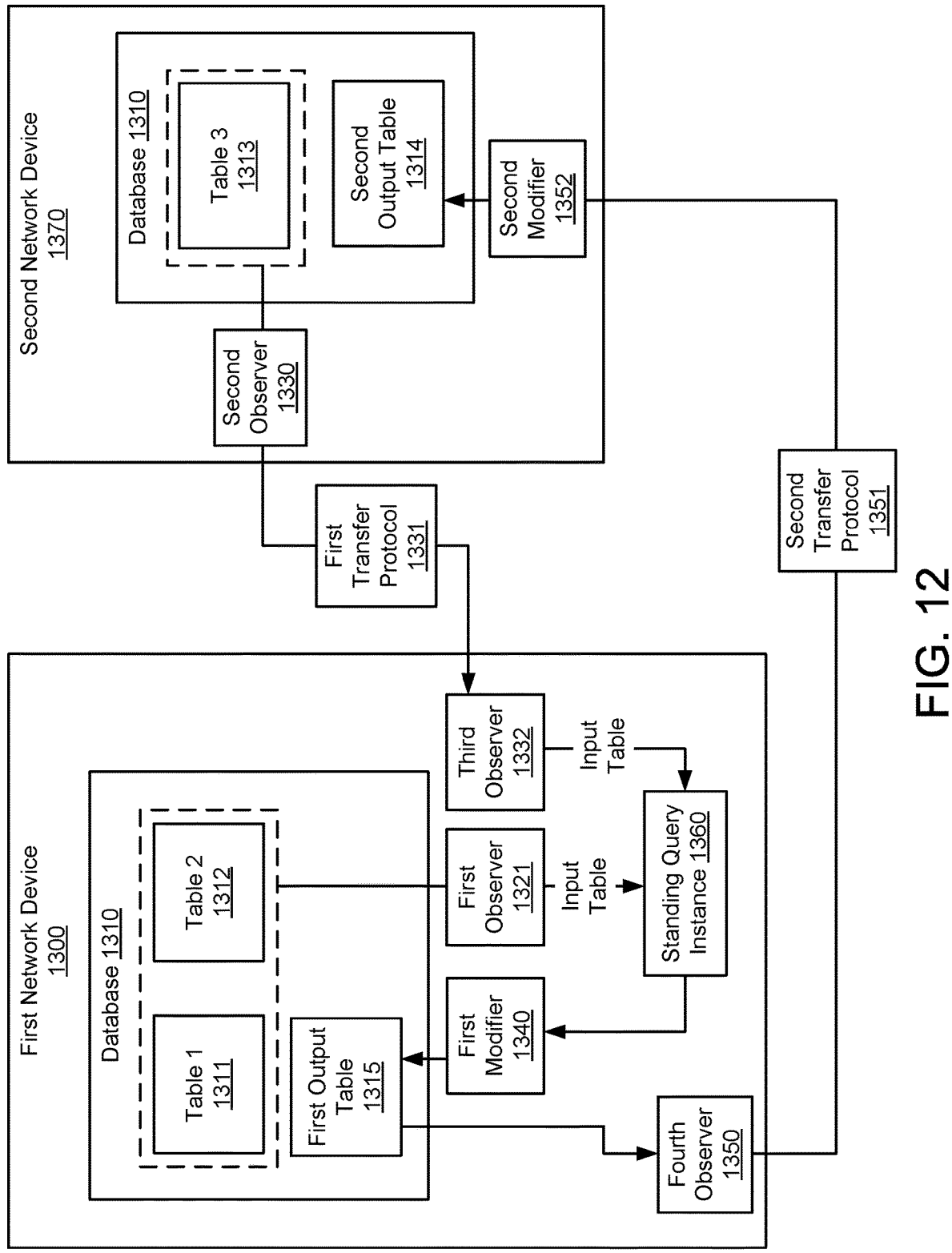
FIG. 12 shows a third example of a database in accordance with one or more embodiments of the invention.

A database (1310) may span across a first network device (1300) and a second network deice (1370) as shown in FIG. 12. The database (1310) may include three tables (1311, 1312, 1315) stored on the first network device (1300) and two tables (1313, 1314) stored on the second network device. An agent (not shown) executing on the first network device (1300) may request that a SQ instance be generated. The request may indicate that elements of Table 1 (1311), Table 2 (1312), and Table 3 (1313) are to be operated on by the SQ instance (1360) and that the output of the SQ instance (1360) is to be stored in an output table (1314) located on the second network device.

In response to the request, a SQS manager (not shown) of the first network device (1300) may perform the method shown in FIG. 8A and generate a SQ instance (1360). To provide data stored on the first network device (1300) to the input table of the SQ instance (1360), the SQS manager may generate a first observer (1321) that propagates modifications to elements of Table 1 (1311) and Table 2 (1312) to the SQ instance (1360). To provide data stored on the second network device (1370) to the input table of the SQ instance (1360), the SQS manager may generate a second observer (1330), a first transfer protocol (1331), and a third observer (1332). The aforementioned observers and transfer protocol may propagate modifications to Table 3 (1313) to the SQ instance (1360).

To store the output of the SQ instance (1360), the SQS manager may generate a first modifier (1340) that stores results generated by the SQ instance (1360) in the first output table (1315) stored on the first network device (1300).

The SQS manager may also generate a fourth observer (1350), second transfer protocol (1351), and second modifier (1352) to store results generated by the SQ instance (1360) in the second output table (1314) stored on the second network device (1370), as requested by the agent.

In response to modifications to observed elements of Table 1 (1311), Table 2 (1312), or Table 3 (1313), the database (1310) may notify the first observer (1321) or second observer (1330) of the modifications. In response to the modifications, the first observer (1321) may propagate the modifications of Table 1 (1311) or Table 2 (1312) to the SQ instance (1360). Also, in response to the modifications, the second observer (1330) may propagate modifications of Table 3 (1313) to the SQ instance (1360) by way of the first transfer protocol (1331) and third observer (1332).

In response to the modification of the input table, the SQ instance (1360) executes the compiled query of the SQ instance (1360) and thereby generates output. The output generated by the compiled query of the second SQ instance (1360) is forwarded to the first modifier (1340) which propagates the output to elements of the first output table (1315).

In response to modifications to the first output table (1315), the database (1310) notifies the fourth observer (1350) of the modifications. In response to the notification, the fourth observer (1350) propagates the modifications to the second output table (1314) by way of the second transfer protocol (1351) and second modifier (1352).

While illustrated as a single observer in FIG. 12, the first observer (1321), second observer (1330), third observer (1332), and/or fourth observer (1350) may be multiple observers, e.g., aggregated observers. In a case where the observers a aggregated observers, the aggregated observers may use a single transport protocol, e.g., the first transport protocol (1331) or the second transfer protocol (1351), to propagate the observed data.

One or more embodiments of the invention may enable one or more of the following: i) generation of new information based on data stored in a database, ii) verification that modifications to elements of a database are propagated to consumers of the data stored in elements of the database, iii) managed interfacing to a database for consumers of data stored in elements of the database, and iv) automatic distribution of data across multiple network device and/or multiple address spaces.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A network device, comprising:
    a database comprising:
        a plurality of tables, wherein a first table of the plurality of tables comprises an element;
        a write history list associated with the element and comprising a plurality of modifications to the element;
        a subscription list, associated with the element of the first table, specifying an observer and a second observer;
        a first write history list position associated with the observer indicating which modifications of the plurality of modifications have been read by the observer;
        a second write history list position associated with the second observer indicating which modifications of the plurality of modifications have been read by the second observer;
        wherein the database is configured to, using the first write history list position and the second write history list position, delete any of the plurality of modifications to the element that have been read by both the observer and the second observer;
    the observer configured to monitor the element of the first table of the plurality of tables and provide a value of the element to a query instance of a plurality of query instances, wherein the value of the element is obtained from the write history list and is located in the write history list after the first write history list position; and
    a query service (QS) manager configured to generate the plurality of query instances, wherein the query instance of the plurality of query instances executes a compiled query in response to receiving the value.

2. The network device of claim 1, wherein the first table of the plurality of tables is stored in a first address space of the network device.

3. The network device of claim 2, wherein a second table of the plurality of tables is stored in a second address space.

4. The network device of claim 2, wherein the QS manager is stored in the first address space of the network device.

5. The network device of claim 2, wherein the plurality of query instances is stored in the first address space of the network device.

6. The network device of claim 1, further comprising:
    a modifier configured to write an output, generated by the execution of the compiled query of the plurality of query instances, to a second element of a second table of the plurality of tables.

7. The network device of claim 6, further comprising:
    a third observer configured to monitor the second element;
    a second query instance of the plurality of query instances configured to generate a second output based on, at least in part, a second value associated with the second element; and
    a second modifier configured to write the second output generated by the second query instance to the database.

8. The network device of claim 1, wherein a second query instance of the plurality of query instances specifies an input table, and wherein the observer is further configured to propagate changes to the element of the first table to the input table.

9. The network device of claim 1, wherein the network device is one selected from a group consisting of a switch, a router, and a multi-level switch.

10. A method of operating a network device, comprising:
    obtaining, by a query service (QS) manager of the network device, a first query request comprising a query type, a constraint parameter, and an input;
    making a first determination, by the QS manager, that a first query service (QS) matches the first query request based on, at least in part, the query type;
    making a second determination, by the QS manager, that a first query instance of the first QS matches the first query request based on, at least in part, the constraint parameter; and
    generating, by the QS manager, a first observer configured to monitor an output of the first query instance based on the first determination and the second determination, wherein the first observer executes on the network device.

11. The method of claim 10, further comprising:
obtaining, by the QS manager, a second query request comprising the query type, a second constraint parameter, and the input;
making a third determination, by the QS manager, that the first QS matches the second query request based on, at least in part, the query type;
making a fourth determination, by the QS manager, that the second constraint parameter does not match a first query instance constraint parameter; and
generating, by the QS manager, a second query instance based on, at least in part, on the third determination and the fourth determination.

12. The method of claim 11, further comprising:
generating, by the QS manager, a first modifier configured to store a second query instance output in a first element of a table of a database in response to the generation of the second query instance;
generating, by the QS manager, a second observer configured to monitor the first element of the table of the database in response to the generation of the second query instance.

13. The method of claim 10, further comprising:
obtaining, by the QS manager, a second query request comprising a second query type, a second constraint parameter, and the input;
making a third determination, by the QS manager, that the second query type does not match the first query instance based on, at least in part, the second query type;
generating, by the QS manager, a second QS in response to the third determination; and
generating, by the QS manager, a second query instance based on, at least in part, the second QS and the second constraint parameter.

14. The method of claim 13, further comprising:
generating, by the QS manager, a first modifier configured to store a second query instance output in a first element of a table of a database;
generating, by the QS manager, a second observer configured to monitor the first element of the table of the database.

15. The method of claim 10, wherein the first query instance is a standing query.

16. The method of claim 15, wherein the standing query executes until terminated by an entity.

* * * * *